United States Patent [19]

Takahashi et al.

[11] 4,102,537
[45] Jul. 25, 1978

[54] SEATED-OPERATOR TYPE TRACTOR

[75] Inventors: Teizo Takahashi, Sakai; Toshiyuki Matsumoto, Yao; Tadashi Nakamura, Kawachinagano; Ryozo Kuroiwa, Sakai, all of Japan

[73] Assignee: Kubota Ltd., Osaka, Japan

[21] Appl. No.: 778,503

[22] Filed: Mar. 17, 1977

[30] Foreign Application Priority Data

Jun. 23, 1976 [JP] Japan .................................. 51-74872
Jun. 18, 1976 [JP] Japan .............................. 51-81011[U]

[51] Int. Cl. ............................................. B62d 25/06
[52] U.S. Cl. ................................................ 296/102
[58] Field of Search ........................ 296/102; 280/756

[56] References Cited

U.S. PATENT DOCUMENTS

| 3,455,599 | 7/1969 | Becker | 296/102 |
| 3,897,960 | 8/1975 | Cosby | 296/102 |
| 3,964,782 | 6/1976 | Pernicka | 296/102 |
| 4,037,614 | 7/1977 | Hines | 296/102 |

Primary Examiner—Robert R. Song
Attorney, Agent, or Firm—Kane, Dalsimer, Kane, Sullivan & Kurucz

[57] ABSTRACT

A tractor with a seat for the operator. A robust safety frame upstanding in gate form is securely supported on chassis framing of the tractor forwardly of the seat. The safety frame has sufficient height that the space occupied by the operator on the seat is entirely underneath a plane circumscribed on top edge of the safety frame and upper rear edge of the tractor body.

4 Claims, 8 Drawing Figures

SEATED-OPERATOR TYPE TRACTOR

BACKGROUND OF THE INVENTION

This invention relates to a seated-operator type tractor. Although various devices for improving safety with respect to working function of the tractor of this type have been contrived and conventionally been in use, no sufficient consideration has so far been paid in securing the safety of the operator in case of accident such as turnover of the tractor body, in spite that the tractor has considerable weight and is not very stable with the construction of rather high center of gravity, perhaps under excuse that the tractor generally travels in slow speed. There has thus been a potential danger of detrimental disaster such as crushing the operator under the tractor body if it should by any chance so badly lose stability as to overturn on heavily irregular ground such as rough slope.

SUMMARY OF THE INVENTION

The seated-operator type tractor according to this invention comprises a seat for the operator, supported on chassis framing of the tractor and defining a space to be occupied by the operator seated thereon, and a safety frame upstanding in gate form securely supported on either side of the chassis framing forwardly of the seat, with such sufficient height that the space occupied by the operator on the seat is entirely underneath a plane circumscribed on top edge of the safety frame and upper rear edge of the tractor body.

With this construction, a tractor securing safety with such simple structure has now according to the invention been provided, in such best imaginable manner, even in case of turnover on rough slope or heavily irregular ground, that the safe space is secured for the seated operator to evade crushing under the tractor body and to freely escape therefrom without being confined therein.

The main object of the invention is thus to provide a seated-operator type tractor highly safe enough to gurantee safe escape of the operator even in case of accidental turnover.

Another object of the invention is to provide such a tractor having detachable safety frames, for securely guaranteeing safety with simple structure.

Still another object of the invention is to provide such a tractor as may easily and rapidly be equipped with a top cover sheeting, making use of the said safety frames.

Other objects and advantages of the invention will become apparent from the following detailed description of a couple of preferred embodiments of the invention illustrated in the accompanying drawings.

DESCRIPTION OF THE PREFERRED EMBODIMENTS

Figure 1:
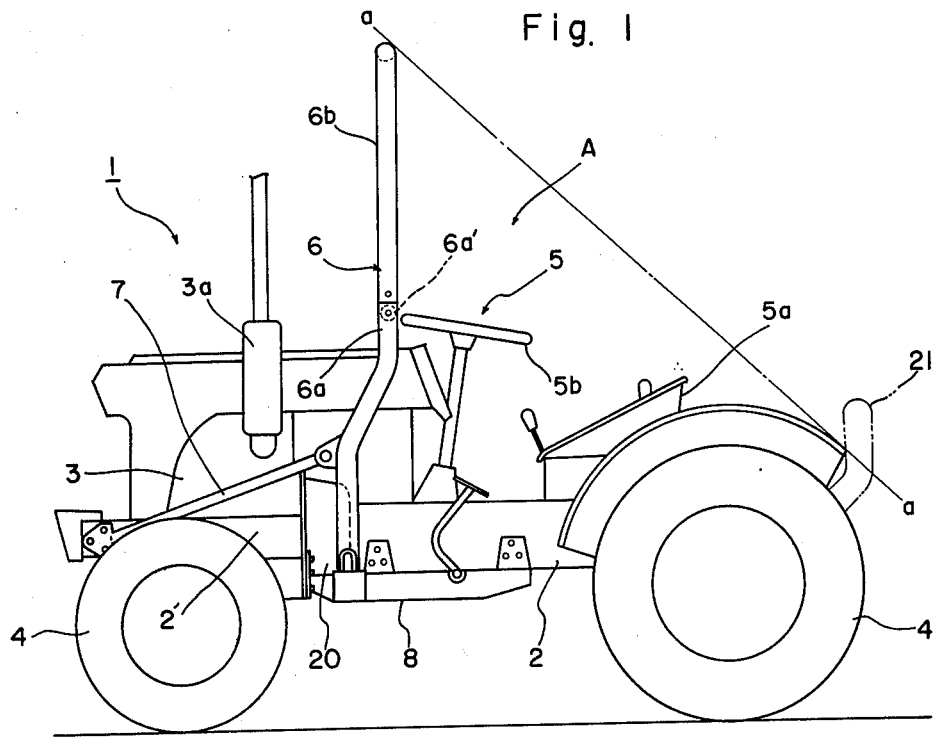
FIG. 1 is a side elevation of a preferred embodiment of the tractor according to the invention.
Figure 2:
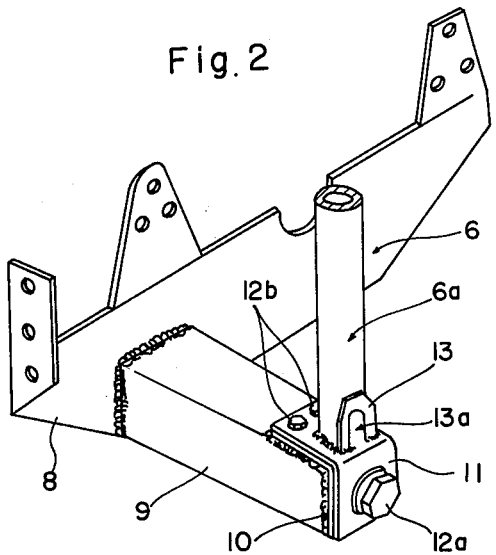
FIG. 2 is an enlarged perspective view of the portion of the tractor, where the safety frame is secured to the chassis framing.

Referring now to an embodiment of the invention illustrated in FIGS. 1-4, a seated-operator type agricultural tractor 1 has its chassis 2; an engine support frame 2', an engine 3 mounted thereon on the front side, and a muffler 3a, extending from the engine; front and rear ground wheels 4; a seat 5a for the operator to maneuver a steering wheel 5b and so forth on the rear side thus defining a space designated generally at 5 to be occupied by the operator; and various auxiliary apparatuses including a main clutch housing 20. In addition to these conventional parts, there are provided novel parts characteristic of the invention, comprising: bracket plates 8 provided on either side as supported on the chassis 2 and lateral flange portion of the clutch housing 20; lateral support lugs 9 provided as protrusion on the bracket plates 8; and a safety frame 6 upstanding in gate form in a place forwardly of the operator's space 5, with bottom end portions securely fixed on to outer end portions of the lugs 9, having such sufficient height that the operator's space 5 is preferably entirely underneath a plane shown as line a—a in FIG. 1 as circumscribed on top edge of this safety frame 6 and upper rear edge of the tractor body, thus within a space A in general shape of a triangle as seen laterally as in FIG. 1, as defined by the chassis 2, safety frame 6 and the said circumscribed plane. The lugs 9 are made robust enough to also mount thereon some working implement such for instance as plows. In the illustrated instance, the safety frame 6 comprises upper and lower portions 6b and 6a, both in gate form by themselves, thus with a horizontal bar 6a' interconnecting both legs of the lower portion 6a, at a level preferably slightly higher than the steering wheel 5b but lower than eye level of the seated operator. How the bottom end portions of the lower safety frame portion 6a is fixed on to the lugs 9 is best seen in FIG. 2. Thus, an L-shaped plate 10 of proper thickness as desired is securely fixed on to the outer end portion of the lug 9, while another complementary L-shaped plate 11 with upright secure lug portion 13 having central aperture 13a for augmenting welding surface is securely fixed on to each bottom end of the lower safety frame portion 6a, and these two L-shaped plates 10 and 11 are tightly screwed up by screw bolts 12a, 12b etc. as illustrated.

In order to make the frame 6 strong enough against deformation in the longitudinal direction of the tractor, proper struts 7 are provided on either side to support a middle portion of the lower safety frame portion 6a on the engine support frame 2'.

Figure 3:
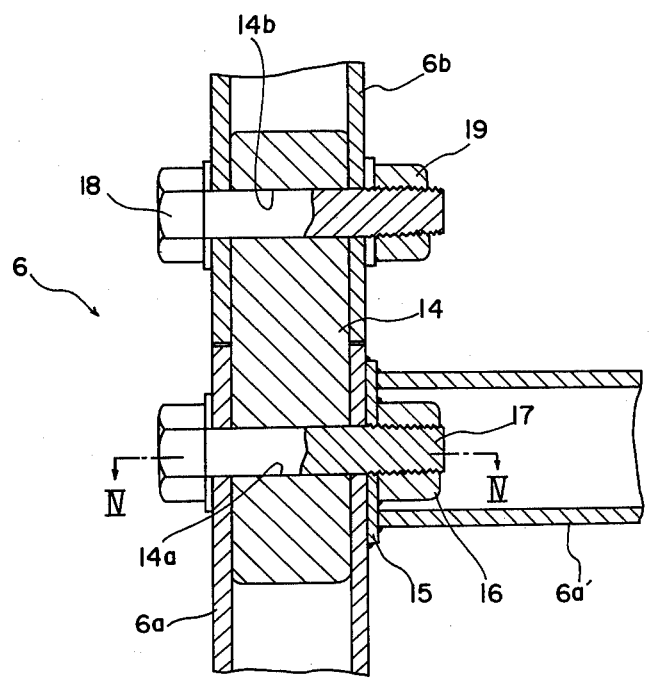
FIG. 3 is a vertical sectional view, in a still larger scale, of the portion where some parts of the safety frame are detachably secured.
Figure 4:
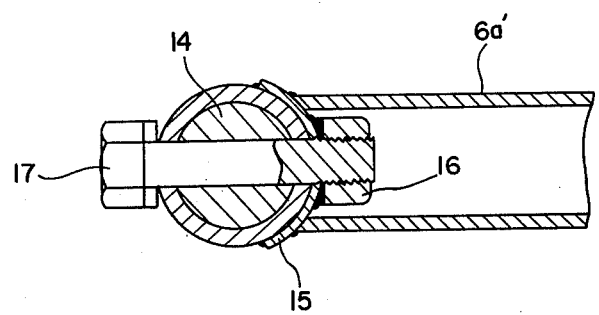
FIG. 4 is a plan view in section as taken along line IV—IV of FIG. 3.
Figure 5:
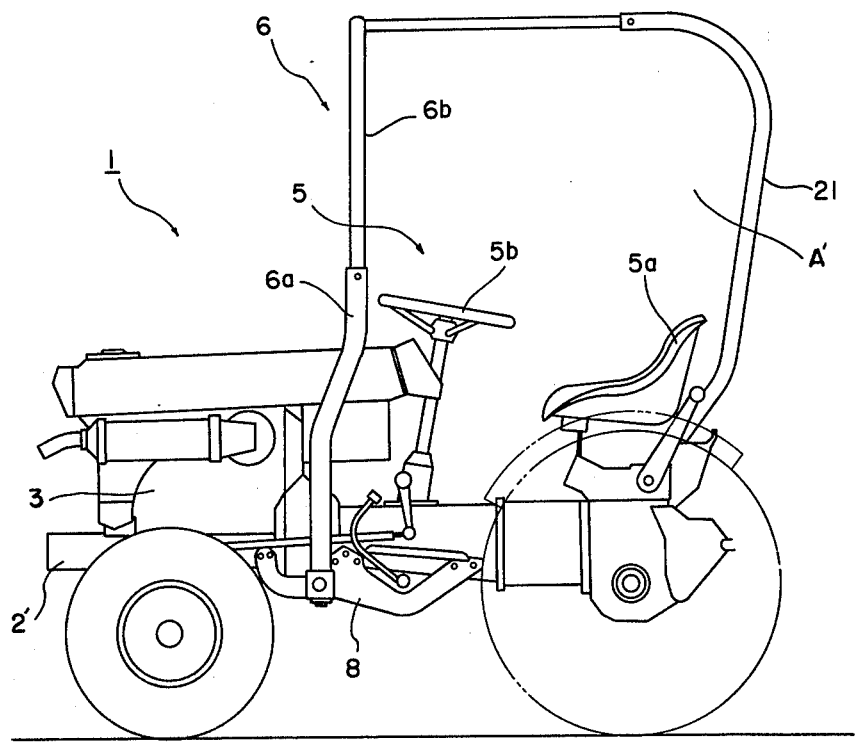
FIG. 5 is a side elevation of another embodiment of the tractor according to the invention.

Referring now to FIGS. 3 and 4, securely fixed to both ends of the horizontal bar 6a' made of a pipe are end plates 15 outwardly concave to be complementary to outer surface of the legs of the lower safety frame portion 6a, also made of pipes. Prior to fixing the bar 6a' and each end plate 15, a nut 16 is securely fixed to the end plate 15 on the convex side thereof, thus to be in the piping 6a' when this latter is fixed. A screw bolt 17 may therefore be screwed into this nut 16 from diametrically opposite side of the leg of the lower safety frame portion 6a through the bores provided therefor in the leg. Upon screwing up the horizontal bar 6a' in such manner, periphery of the end plate 15 may quite easily be welded to the leg, thus the screwing and welding both contributing to secure connection.

How to detachably connect the upper safety frame portion 6b on to the lower portion 6a, both made of pipes, is also seen in FIG. 3. Thus, a mandrel or core 14 common to both of these portions 6a and 6b and provided with diametral bores 14a and 14b is inserted in the connecting portion, and a screw bolt 18 is inserted through the bore 14b and a nut 19 is screwed up thereon, while the bore 14a receives the screw bolt 17 already described above with respect to fixing the horizontal bar 6a'.

With such upstanding safety frame 6, there would remain at least the unhindered space A, even if the tractor 1 should turn over or topple down sideways, providing safety for the operator who is protected from being crushed over and may easily escape from the tractor body even in case of such overturn accident.

In addition to the safety frame 6, another protection frame 21 may preferably be provided at the rear of the tractor body as shown in phantom in FIG. 1, for prevention of damaging the tractor in case of toppling on the back.

Referring now to another embodiment of the invention illustrated in FIGS. 5–8, an agricultural tractor 1 is shown with the conventional parts just same as were described with respect to the former embodiment illustrated in FIGS. 1-4, namely: chassis 2, engine support frame 2', engine 3, muffler 3a, ground wheels, seat 5a and steering wheel 5b defining operator's space 5, and various other auxiliary apparatuses.

Figure 6:
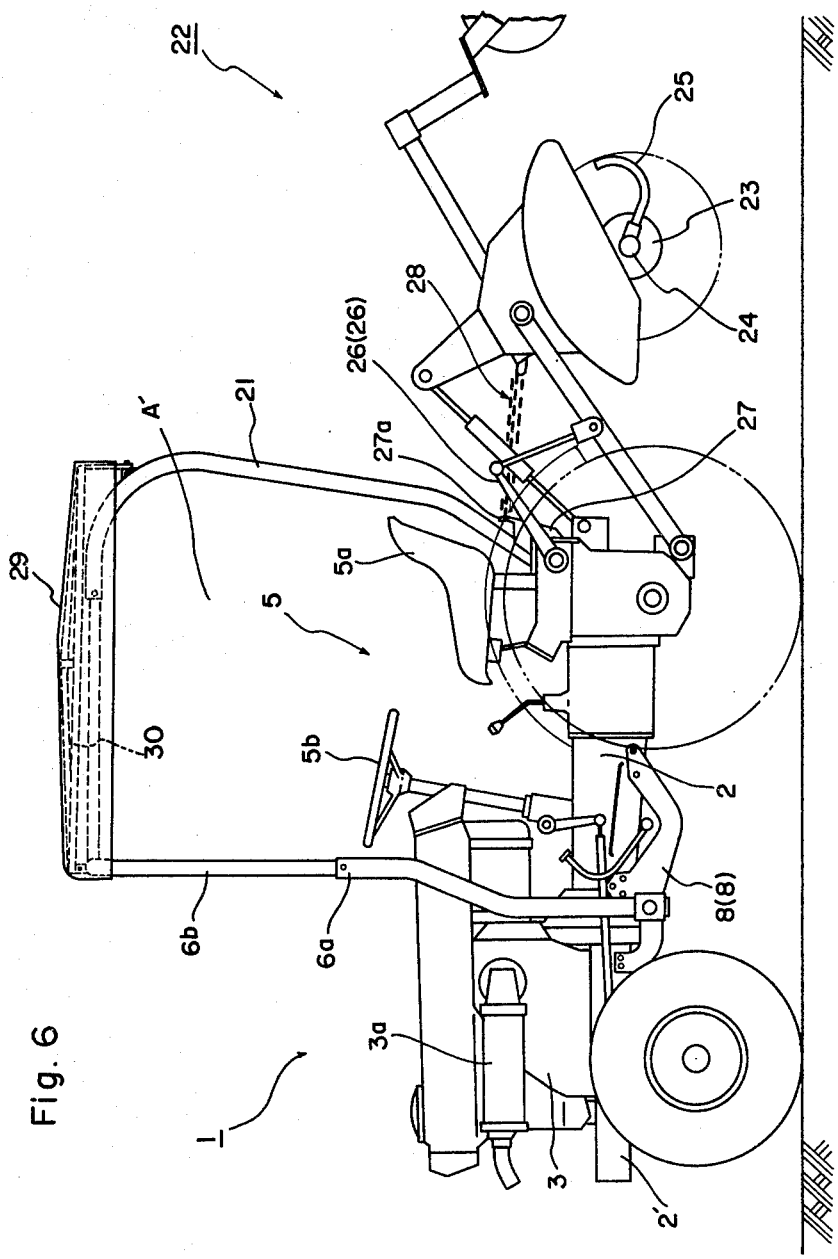
FIG. 6 is a view similar to FIG. 5 but now with cultivation implement and a top cover sheeting attached to the tractor.
Figure 7:
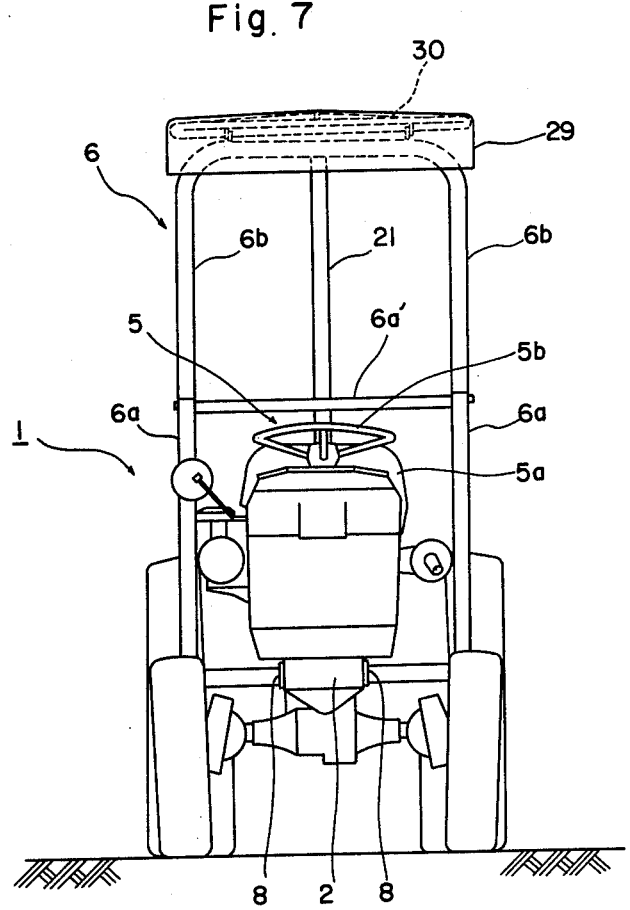
FIG. 7 is a front view of the tractor of FIG. 6.

FIGS. 6 and 7 show this tractor attached by way of example with a conventional rotary cultivation implement generally designated at 22. This implement 22 substantially comprises a rotary shaft 24 which is supported by a shaft casing 23 and which is provided a plurality of cultivation tines 25 securely fixed thereon. The entirety of this implement 22 is attached to the tractor 1 by means of a link mechanism for free raising and lowering pivotal movement on supporting horizontal axes, and hydraulic driving means is provided for forcibly actuating the raising and lowering in accordance with lift arms 26 on either side which can also be locked in any of such raising and lowering position thus to hold the implement at any level as desired. FIG. 6 also shows a locking chain 28 trained between a suitable point on upper portion of the implement 22 and a lug or hook 27a protruding upwards from supporting frame means 27 securely attached on to rear portion of the chassis 2 by bolt and nut means for mounting the implement 22 hereon. This locking chain 28 may be trained when the tractor 1 is travelling on a road for movement to and from a working field, with the implement 22 fully raised up to the inactive position, thus securing the locking by this mechanical tension or suspension even in case of any accidental failure of the hydraulic assembly such as oil leaking, for prevention of damaging the implement 22 by hitting the ground in such hydraulic failure.

In addition to these conventional parts, novel parts for safety of the operator are also provided in the present embodiment as well. Such novel parts include a safety frame 6 substantially same as the frame 6 described with respect to the former embodiment illustrated in FIGS. 1–4, but there is included in the parts for safety in the present embodiment a rear safety frame 21 in addition to the said frame 6. As is best seen in FIG. 8, this rear safety frame 21 is generally in L- or J-letter form extending above and rearwardly of the operator's space 5, with ends securely attached to a center top portion of the safety frame 6 and a center portion of the rear of the tractor body, respectively, thus positively defining space A' in the present embodiment in between this rear safety frame 21 and the safety frame 6, making the operator's space 5 safe enough even in case of turnover of the tractor body as might by any chance occur in crossing high furrows or in travelling on rough slope.

Describing now more in detail, bottom end of the rear safety frame 21 is in the illustrated instance secured on to the supporting frame means 27 already described with respect to the locking chain hook 27a.

Figure 8:
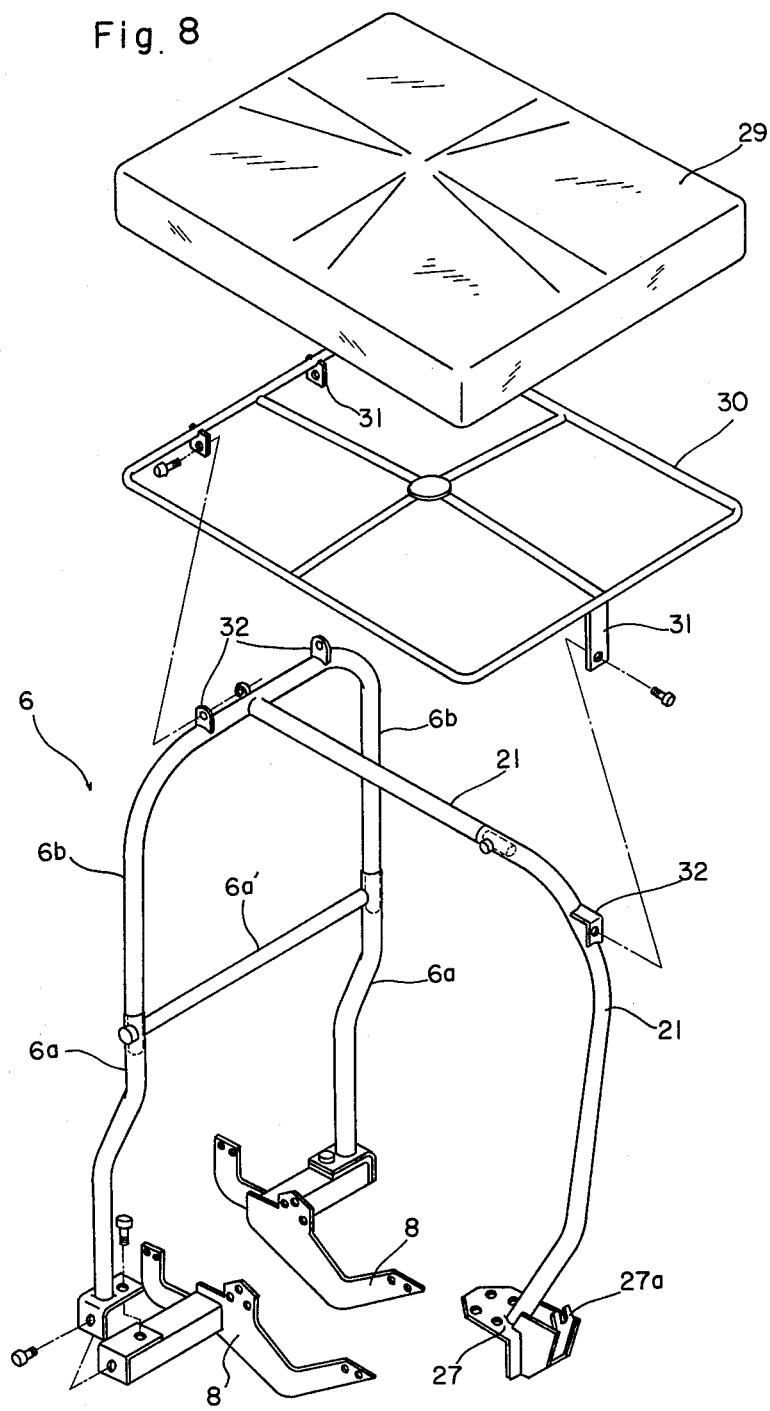
FIG. 8 is a perspective view of the parts used in the tractor of FIGS. 5–7, as are essential to the invention.

As is also best seen in FIG. 8, a supporting frame 30 suitable to support a top covering sheet 29, as may be fitted to the frame 30 for instance by fitting thread for screening sunshine or rain, has brackets 31 as are engageable with mating brackets 32 provided on the safety frame 6 and the rear safety frame 21, and may thus detachably be attached on to the top of the frames 6 and 21 by screw bolt means tightening the mating brackets 31 and 32. The sheet 29 may be fitted to the frame 30 beforehand, and may then be conveniently handled with its shape properly held. Engagement and disengagement of this sunshine and rain screening means can thus be quite easily and quickly be done on field freely as desired, contrary to the inconvenience as would be experienced should the self-unholding flexible sheet 29 be directly fitted on field on to the safety frame 6 and rear safety frame 21. In the illustrated instance, the rear safety frame 21 is constructed of two detachable parts fixed up together by bolt and nut means as best seen in FIG. 8, but such is not essential to the invention and simple integral construction is of course possible.

What is claimed is:

1. A seated-operator type tractor comprising a seat for the operator supported on a chassis framing of the tractor, a safety frame upstanding in gate form securely supported on either side of the chassis framing forwardly of the seat, said safety frame having detachable upper and lower portions interconnected at a level slightly higher than the top of a steering wheel on said tractor, and a rear safety frame, characterized in that said rear safety frame is formed in L or J letter shape and extends above and rearwardly of the seat, with one end fixed to a center top portion of safety frame and the other end detachably attached to a center portion of the rear of the tractor body.

2. A seated-operator type tractor as defined in claim 1 wherein the safety frame has bracket plates and the rear safety frame has supporting frame means, said bracket plates and supporting frame means being detachably attached to the tractor body.

3. A seated-operator type tractor as defined in claim 2 wherein said supporting frame means has a locking chain hook for carrying a rotary cultivation implement.

4. A seated-operator type tractor as defined in claim 3, further comprising a supporting frame to support a top covering sheet which is detachably attached on top of the safety frame and the rear safety frame.

* * * * *